(12) United States Patent
Limpert et al.

(10) Patent No.: US 9,170,368 B2
(45) Date of Patent: Oct. 27, 2015

(54) SINGLE-MODE PROPAGATION IN MICROSTRUCTURED OPTICAL FIBERS

(75) Inventors: Jens Limpert, Jena (DE); Fabian Roeser, Dresden (DE); Tino Eidam, Jena (DE); César Jáuregui Misas, Jena (DE); Andreas Tuennermann, Weimar (DE)

(73) Assignees: FRAUNHOFER-GESELLSCHAFT ZUR FOERDERUNG DER ANGEWANDTEN FORSCHUNG E.V., Munich (DE); FRIEDRICH-SCHILLER-UNIVERSITAET JENA, Jena (DE)

( * ) Notice: Subject to any disclaimer, the term of this patent is extended or adjusted under 35 U.S.C. 154(b) by 808 days.

(21) Appl. No.: 13/138,618

(22) PCT Filed: Mar. 12, 2010

(86) PCT No.: PCT/EP2010/001586
§ 371 (c)(1),
(2), (4) Date: Nov. 22, 2011

(87) PCT Pub. No.: WO2010/102833
PCT Pub. Date: Sep. 16, 2010

(65) Prior Publication Data
US 2012/0069428 A1  Mar. 22, 2012

(30) Foreign Application Priority Data

Mar. 13, 2009  (DE) .......................... 10 2009 012 662
Dec. 29, 2009  (DE) .......................... 10 2009 060 711

(51) Int. Cl.
G02B 6/02  (2006.01)
H01S 3/067  (2006.01)
G02B 6/14  (2006.01)

(52) U.S. Cl.
CPC ........ *G02B 6/02352* (2013.01); *G02B 6/02347* (2013.01); *G02B 6/02361* (2013.01);
(Continued)

(58) Field of Classification Search
CPC ............ H01S 3/06729; H01S 3/06737; H01S 3/06741; G02B 6/02295; G02B 6/02366; G02B 6/02352; G02B 6/02357
See application file for complete search history.

(56) References Cited

U.S. PATENT DOCUMENTS 5,818,630 A   10/1998  Fermann et al.
6,987,783 B2 *  1/2006  Fajardo et al. .................... 372/6
(Continued)

FOREIGN PATENT DOCUMENTS

DE       198 28 154        1/1999
DE    10 2006 023 976      4/2007
EP         1 845 397       10/2007

OTHER PUBLICATIONS

International Search Report of PCT/EP2010/001586, Jun. 25, 2010.
(Continued)

*Primary Examiner* — Ari M Diacou
(74) *Attorney, Agent, or Firm* — Collard & Roe, P.C.

(57) ABSTRACT

The invention relates to an optical fiber as an optical waveguide for the single-mode operation. The present invention proposes a fiber having a microstructure, by which the propagation of modes of a higher order are selectively suppressed in the optical waveguide. At the same time, the propagation of transversal modes of a higher order is dampened more strongly than the propagation of the fundamental modes of the optical waveguide.

15 Claims, 2 Drawing Sheets

(52) U.S. Cl.
CPC ......... *H01S3/06729* (2013.01); *G02B 6/02009* (2013.01); *G02B 6/02333* (2013.01); *G02B 6/02366* (2013.01); *G02B 6/14* (2013.01)

(56) References Cited

U.S. PATENT DOCUMENTS

| | | | |
|---|---|---|---|
| 7,280,730 | B2 | 10/2007 | Dong et al. |
| 7,424,193 | B2 | 9/2008 | Galvanauskas |
| 7,526,167 | B1* | 4/2009 | Minelly ..................... 385/126 |
| 7,532,792 | B2* | 5/2009 | Skovgaard et al. ............. 385/39 |
| 7,787,729 | B2 | 8/2010 | Dong et al. |
| 8,381,548 | B2* | 2/2013 | Takenaga ..................... 65/409 |
| 2004/0175084 | A1 | 9/2004 | Broeng et al. |
| 2004/0202438 | A1* | 10/2004 | Eggleton et al. ............ 385/125 |
| 2004/0233941 | A1* | 11/2004 | Fajardo et al. ................. 372/6 |
| 2005/0069269 | A1* | 3/2005 | Libori et al. ............... 385/125 |
| 2005/0157998 | A1* | 7/2005 | Dong et al. ................. 385/126 |
| 2006/0165361 | A1 | 7/2006 | Hongo |
| 2006/0176911 | A1 | 8/2006 | Salin et al. |
| 2006/0193582 | A1* | 8/2006 | Ouderkirk et al. ............ 385/126 |
| 2006/0263024 | A1* | 11/2006 | Dong et al. ................. 385/125 |
| 2009/0034059 | A1 | 2/2009 | Fini |
| 2009/0207485 | A1* | 8/2009 | Goto ......................... 359/341.3 |
| 2009/0324186 | A1* | 12/2009 | Goto ............................. 385/127 |
| 2011/0188825 | A1* | 8/2011 | Alkeskjold ................... 385/126 |
| 2012/0151968 | A1* | 6/2012 | Takenaga ....................... 65/390 |
| 2013/0016949 | A1* | 1/2013 | Yao et al. ...................... 385/126 |

OTHER PUBLICATIONS

Imamura, K. et al., "Design Optimization of Holey Fibers to Realize Zero Dispersion in 500 nm Band and Suppressed Higher-Order Modes Propagation," Winter Topical Meeting Series, 2008, IEEE/LEOS, IEEE, PI, Jan. 1, 2008, pp. 160-161, XP031211353.

Egorova, O. N. et al., "All-Solid Photonic Bandgap Fiber with Large Mode Area and High Order Modes Suppression," May 4, 2008, Lasers and Electro-Optics, 2008, CLEO, 2008, Conference on, IEEE, Piscataway, NJ, USA, pp. 1-2, XP031277643.

Arismar Cerqueira, S. et al., "PCFDT: An accurate and friendly photonic crystal fiber design tool," Optik, Wissenschaftliche Verlag GmbH, Germany, vol. 119, No. 15, Nov. 1, 2008, pp. 723-732, XP025585054.

Canning, J., "Photonic crystal fibres and gratings: enabling a novel approach to lasers, sensors and other applications," LEOS, 2005, IEEE Annual Meeting Conference Proceedings, Sydney, Australia, Oct. 23-27, 2005, Piscataway, NJ, Oct. 23, 2005, pp. 862-863, XP010886832.

* cited by examiner

SINGLE-MODE PROPAGATION IN MICROSTRUCTURED OPTICAL FIBERS

CROSS REFERENCE TO RELATED APPLICATIONS

This application is the National Stage of PCT/EP2010/001586 filed on Mar. 12, 2010 which claims priority under 35 U.S.C. §119 of German Application No. 10 2009 012 662.7 filed on Mar. 13, 2009 and German Application No. 10 2009 060 711.0 filed on Dec. 29, 2009, the disclosures of which are incorporated by reference. The international application under PCT article 21(2) was not published in English.

BACKGROUND OF THE INVENTION

1. Field of the Invention

The invention relates to an optical fiber as an optical waveguide for single-mode operation.

2. Description of the Related Art

Optical fibers are used in fiber-based laser systems, for example as optically pumped amplifier fibers. Fiber lasers fulfill varied tasks, for example in high-precision material processing or also in measurement technology. Their advantages are great power density as well as high beam quality, both in pulsed operation and cw operation. Refraction limitation in fiber lasers also has great significance. This is advantageous in the case of material processing, for example, where precision is important.

Limiting factors in the development of fiber lasers are non-linear effects such as Raman scattering and self-phase modulation, for example. These are proportional to the power density in the fiber and the fiber distance traveled. A reduction in non-linear effects can be achieved by means of increasing the size of the light-guiding fiber region, i.e. the diameter of the fiber core. The design of corresponding large-core fibers is therefore aimed at preferentially propagating the fundamental mode in the fiber (so-called single-mode operation).

Various variants of large-core fibers that work in single-mode operation are known from the state of the art.

For example, DE 198 28 154 A1 describes the use of a conventional large-mode-area (LMA) fiber, in which only a small number of modes propagates at an increased diameter. To suppress higher transversal modes, the fiber is bent in targeted manner, and, at the same time or alternatively, a mode selection is carried out by means of optimized excitation.

US 2006/0176911 A1 describes a fiber in the so-called "rod-type" design. Here, the fiber consists of a central core and a mantle that surrounds it, which guides the pumped light. The mantle has a photonic structure composed of capillaries spaced apart from one another and disposed in regular manner, which run parallel to the core. Another sheath having a lower index of refraction is disposed outside of the mantle. In total, the diameter of the fiber amounts to between 1 mm and 10 mm. The fiber length amounts to less than 1 m.

Furthermore, solutions are known in which a central fiber core has at least one helical core wound around it (for example U.S. Pat. No. 7,424,193 B2). Here, the fundamental mode propagates in the central core, while the modes of a higher order couple into the helical core and propagate there, or are attenuated by means of losses, respectively.

U.S. Pat. No. 7,280,730 B2 describes hollow fibers having a hexagonal hole structure in the cladding. The structure is designed in such a manner that the ratio of hole diameter to hole spacing is greater than 0.35. A core that remains free is formed in the center of the hexagonal structure; this core is large enough to reduce non-linear effects to an acceptable dimension.

In DE 10 2006 023 976 A1 and US 2006/0263024 A1, respectively, the goal of obtaining fibers having large cores, which guarantee single-mode propagation, is pursued. The fibers have hole structures in the mantle, whereby the principle is to dispose the largest possible holes as close to one another as possible in the mantle.

SUMMARY OF THE INVENTION

It is the task of the invention to create an improved optical fiber, which works in single-mode operation and has little susceptibility to non-linear effects.

To accomplish this task, the invention proposes that the fiber has a structuring by means of which propagation of modes of a higher order in the optical waveguide is suppressed.

The invention is based on the approach of achieving the result, by means of targeted structuring (for example of the mantle regions of the fiber), that the propagation of transversal modes of a higher order is attenuated more strongly than the propagation of the fundamental mode of the optical waveguide. In general, higher transversal modes (HOM) in optical multi-mode fibers possess different, i.e. generally higher propagation losses than the fundamental mode (FM). However, the absolute values of attenuation are so low that in the final analysis, all the modes can propagate within the fiber over long distances, practically without losses. By means of the microstructuring according to the invention, the difference of the propagation losses of the FM as compared with the losses of the HOM are shifted into a range in which the attenuation of the FM is acceptable, or can be compensated by means of amplification, but at the same time, the attenuation of the HOM is so great that their propagation is decisively inhibited. For practical purposes, the structuring according to the invention should be configured in such a manner that the propagation losses for the FM, over the fiber length, amount to less than 3 dB, and for the HOM, particularly for the first mode above the FM, amount to more than 20 dB.

According to the invention, the structuring can comprise regions in which the index of refraction deviates from the index of refraction of the other regions. The geometry of the structuring in combination with suitable indexes of refraction allows targeted excitation of modes capable of propagation. The introduction of structures having the lowest possible index of refraction can be advantageous. Accordingly, the structuring of the fiber can comprise hollow structures (holes).

A particularly advantageous embodiment provides that the structuring, viewed in the cross-section of the fiber, comprises an air ring disposed coaxial to the fiber (for example formed by axial holes). In this connection, it can additionally be provided that the air ring has interruptions in the circumference direction. In this connection, the symmetry or the geometry, respectively, of these interruptions is designed in such a manner that the losses of the HOM are optimally adapted to the desired fiber length, in comparison with the losses of the FM. For further optimization of the properties of the fiber according to the invention, oblong or linear structures can be provided, which extend essentially radially from the air ring, again viewed in the cross-section of the fiber, which structures can also be formed from multiple axial holes, in each instance. Preferably, these radial structures extend outward (viewed from the center axis of the fiber), proceeding from the edge regions of the interruptions.

An embodiment variant consists in that the structuring comprises channels that run along the longitudinal expanse of the fiber. In this way, a constant mode selection can be achieved over the entire length of the fiber. In this connection, however, the structuring can also change over the fiber length. For example, the channels can close and open again.

According to the invention, the diameter of the channels is not greater than twenty times, preferably not greater than ten times the wavelength of the radiation that is guided in the optical waveguide. The diameter of the channels must be kept as low as possible, with regard to the total diameter of the fiber, while at the same time, the channels must have a minimum diameter, so that the light guided in the fiber can enter into interaction with the structure according to the invention.

An advantageous embodiment of the optical fiber provides that the ratio of channel diameter to distance between the center axes of two channels is less than 0.5, whereby the distance between the center axes of two channels is greater than twenty times the wavelength of the radiation guided in the optical waveguide. In practice, these parameters have proven to be particularly advantageous, in order to filter out the HOM as effectively as possible. In this connection, the ratio of channel diameter to distance between center axes of two channels, with a value less than 0.5, ensures relatively thin channels having a relatively great distance between the individual channels. In this connection, the fiber core of the optical fiber is formed by a region of the fiber in which no channels run. This region can have a comparatively large cross-section with a diameter in the range of greater than 20 µm. Non-linear effects are therefore effectively suppressed or avoided, respectively. At the same time, the structuring according to the invention allows single-mode operation.

An alternative embodiment provides that the ratio of channel diameter to distance between the center axes of two channels is less than 0.35, whereby again, the distance between the center axes of two channels is greater than twenty times the wavelength of the radiation guided in the optical waveguide. In this connection, the fiber core in which the FM propagates is formed by at least one missing channel. In this design, as well, single-mode operation with little susceptibility for non-linear effects, at high light intensity, is possible.

The channels within the optical fiber, viewed in the cross-section of the fiber, can be disposed in hexagonal manner. The geometrical arrangement allows targeted fine-tuning of the mode selection within the fiber.

In a preferred embodiment of the optical fiber according to the invention, the channels, viewed in the cross-section of the fiber, form groups composed of at least two channels, in such a manner that the distances between the center axes of the channels within a group are less than the distances between the center axes of the channels of different groups, whereby the distance of the centroidal axes of the groups is greater than twenty times the wavelength of the radiation guided in the optical waveguide. In this connection, the centroidal axis is the axis that runs through the geometrical centroid of the channel cross-sections of the group, in each instance. In this embodiment, the HOM are effectively filtered out. In this connection, relatively thin channels disposed in groups, with a relatively great distance between the groups of channels, are obtained. At the same time, a core region having a comparatively large cross-section (greater than 20 µm) can be obtained. The groups of the channels can, once again, be disposed hexagonally around the core region.

According to the invention, the material of the fiber is doped with ions of the rare earths, at least in partial regions. This allows the use of the optical fiber as an active fiber, for example in a laser. A local index increase in the fiber generally occurs as a result of the doping. Typically, this index increase is compensated by means of an additional co-doping, so that effectively, an index reduction is achieved. In this connection, the index reduction should be less than $3\times10^{-4}$, preferably less than $2\times10^{-4}$, less than $1\times10^{-1}$, or even less than $5\times10^{-5}$. A fiber doped in this manner can be used as an amplifier fiber. Selective local doping in the center of the fiber can be used to bring about a preferred amplification of the FM, in targeted manner.

In an advantageous embodiment, the fiber can be enclosed by another light-guiding structure. A dual-core concept can be implemented by means of the sheathing with a second waveguide structure. The outer (preferably undoped) light-guiding structure can guide the pumped light in a fiber laser, for example.

Supplementally, the optical fiber can be configured to be resistant to bending or rigid, depending on the requirements of the application environment. For this purpose, the total diameter of the fiber should amount to at least 0.5 mm, preferably at least 1 mm. Bending losses are avoided in this "rod-type" design.

It is also advantageous if the fiber core has an index of refraction gradient in at least one direction, transverse to the longitudinal axis of the fiber (for example in the radial direction). In this connection the index of refraction gradient can change constantly. An index of refraction gradient in the core region can be achieved by means of a constantly changing index of refraction of the fiber. This is particularly advantageous in order to guarantee pre-compensation of bending losses. Thus, it is possible to create bent fibers having a large mode field diameter, without having to accept mode distortion or mode compression, respectively.

Finally, the invention provides for the possibility of configuring the optical fiber in polarizing or polarization-maintaining manner. By means of a targeted placement of the channels, for example only in a longitudinal plane of the fiber, it is possible to bring about the formation of a specific polarization state. Likewise, stress-induced birefringence can be provided, in order to cancel out degeneration of the inherent polarization states of the FM.

BRIEF DESCRIPTION OF THE DRAWINGS

Exemplary embodiments of the invention will be explained in greater detail in the following, using the drawings.

DETAILED DESCRIPTION OF THE PREFERRED EMBODIMENTS

Cross-sections of optical fibers that are designed according to the invention, as optical waveguides for single-mode operation, are shown. To make the dimensions clear, the figures contain coordinate axes with length information in µm.

In its light-guiding regions, the fiber has a structuring by means of which the propagation of higher order modes in the optical waveguide is selectively suppressed. By means of the structuring, the propagation of transversal higher order modes (HOM) is supposed to be attenuated more strongly than the propagation of the fundamental mode (FM) of the optical waveguide.

In all the exemplary embodiments, the fiber material 2 has an index of refraction of 1.45. The structuring is formed by regions in which the index of refraction deviates from the index of refraction of the other regions. For this purpose, air channels 1 (index of refraction=1.0) that run parallel to the longitudinal expanse of the fiber are provided.

Figure 1:
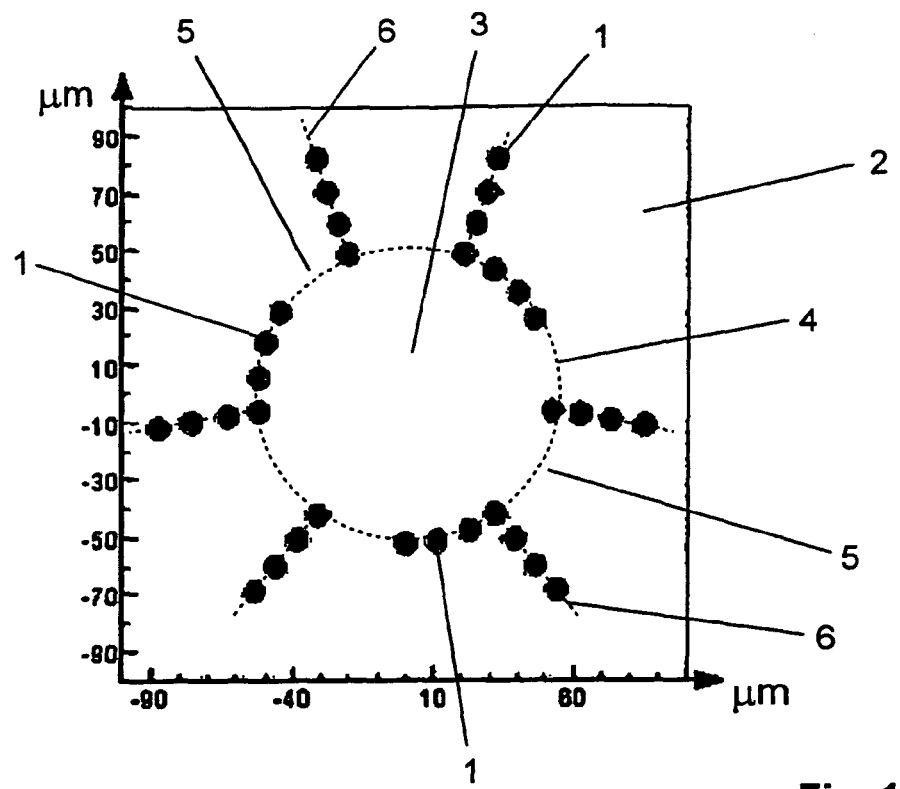
FIGS. 1 to 3 schematically show cross-sections through optical fibers configured according to the invention.

In FIG. 1, the air channels 1 are embedded into the fiber material 2 in such a manner that a relatively large fiber core 3 having a diameter of approximately 100 μm forms in the center of the structure. In this connection, the air channels 1 form an air ring 4 (shown with a broken line in FIG. 1) that is essentially circular in cross-section, and has interruptions 5 in the circumference direction, which consist of the fiber material 2. The diameter of the air channels 1 is not greater than ten times the wavelength of the radiation being guided. Furthermore, oblong or linear structures 6 that extend essentially radially from the air ring 4 are provided, which structures are also formed from multiple axial air channels 1, in each instance. These radial structures extend outward, proceeding from the edge regions of the interruptions 5. The geometry of the arrangement of the air channels 1, as shown, is selected to be such that the losses of the HOM are maximized in relation to the losses of the FM. This ratio can be adapted to the desired fiber length by means of the geometry selected in each instance.

Figure 2:
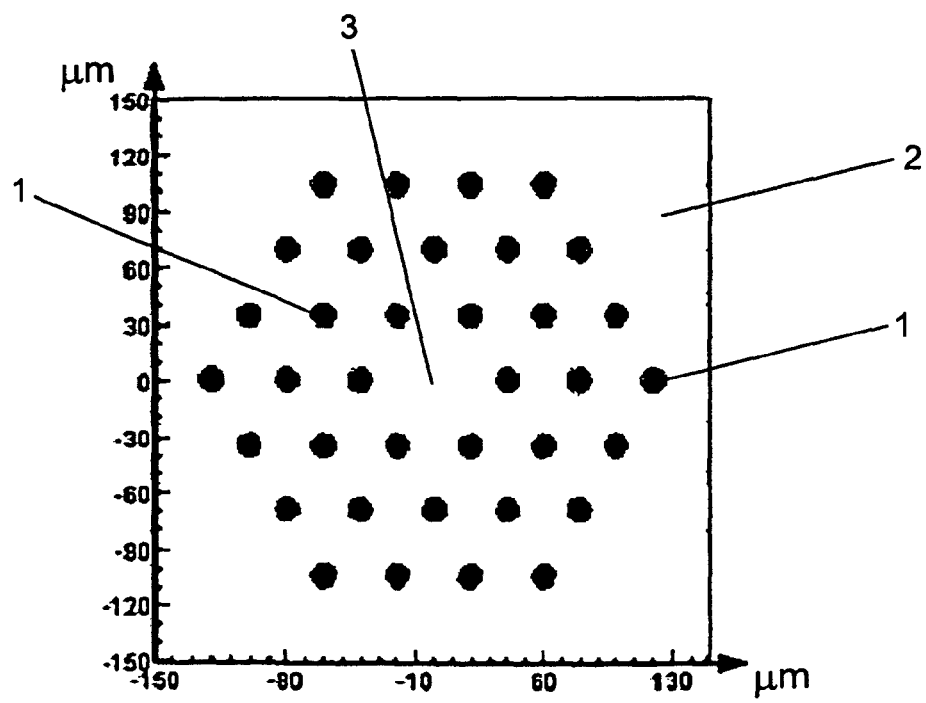

In FIG. 2, a hexagonal arrangement of the air channels 1 within the fiber material 2 is shown. The fiber core 3 is formed by a region of the fiber in which no air channels 1 run. In the exemplary embodiment shown, the ratio of channel diameter to distance between the center axes of two channels is less than 0.35. At the same time, the distance between the center axes of two channels amounts to more than 20 μm. These parameters guarantee effective suppression of the HOM. The region of the fiber core 3 has a large cross-section having a diameter of about 65 μm. The light is effectively guided in the FM in this diameter.

Figure 3:
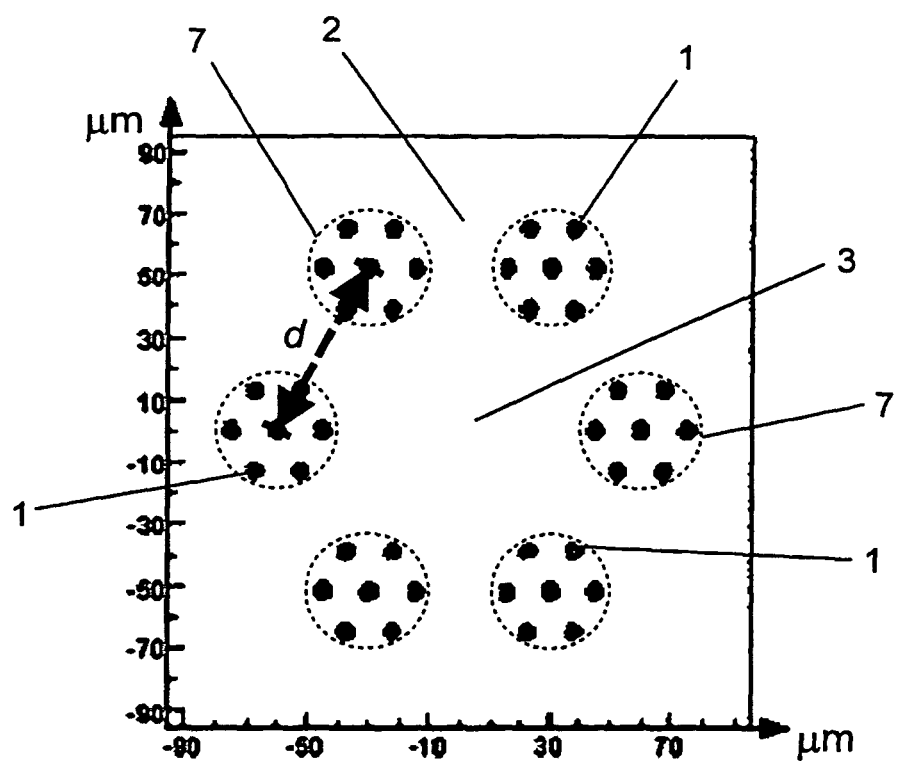

In FIG. 3, multiple hexagonal partial structures in the form of groups 7 (indicated by broken-line circles) are formed from seven hexagonally arranged air channels 1, in each instance. The center of the fiber cross-section, again surrounded by the groups 7 in a hexagonal geometry, forms the fiber core 3. The diameter of the air channels 1 is not greater than ten times the wavelength of the guided radiation, in the case of this exemplary embodiment, as well. The distance d between the centroidal axes of the groups 7 is greater than twenty times the wavelength of the radiation guided in the optical waveguide. As can be seen in FIG. 3, relatively thin air channels 1 disposed in groups, with a relatively great distance between the groups 7 of the air channels 1, are obtained, so that a correspondingly large fiber core 3 results.

The invention claimed is:

1. An optical fiber as an optical waveguide for single-mode operation, wherein the fiber has a structuring by means of which propagation of higher order modes in the optical waveguide is selectively suppressed, wherein the structuring comprises an air ring disposed coaxial to the fiber and channels that run along the longitudinal expanse of the fiber, whereby a fiber core is formed by a region of the fiber in which no channels run, wherein the air ring has interruptions in the circumference direction, wherein the optical fiber further comprises radial structures that extend radially from the air ring, wherein the radial structures extend outward, proceeding from the edge regions of the interruptions.

2. The optical fiber according to claim 1, wherein the propagation of transversal higher order modes is attenuated more strongly than the propagation of the fundamental mode of the optical wave guide, by means of the structuring.

3. The optical fiber according to claim 1, wherein the structuring comprises regions in which the index of refraction deviates from the index of refraction of the other regions.

4. The optical fiber according to claim 1, wherein the diameter of the channels is not greater than twenty times the wavelength of the radiation guided in the optical waveguide.

5. The optical fiber according to claim 1, wherein the ratio of channel diameter to distance between the center axes of two channels is less than 0.5, whereby the distance between the center axes of two channels is greater than twenty times the wavelength of the radiation guided in the optical waveguide.

6. The optical fiber according to claim 1, wherein the ratio of channel diameter to distance between the center axes of two channels is less than 0.35, whereby the distance between the center axes of two channels is greater than twenty times the wavelength of the radiation guided in the optical waveguide.

7. The optical fiber according to claim 1, wherein the channels are disposed hexagonally, viewed in the cross-section of the fiber.

8. The optical fiber according to claim 1, wherein the material of the fiber is doped with ions of the rare earths.

9. The optical fiber according to claim 1, wherein the fiber is enclosed by another light-guiding structure.

10. The optical fiber according to claim 1, wherein the fiber is configured to be resistant to bending or rigid.

11. The optical fiber according to claim 1, wherein the fiber core has an index of refraction gradient in at least one direction transverse to the longitudinal axis of the fiber.

12. The optical fiber according to claim 11, wherein the index of refraction gradient changes constantly in at least one direction transverse to the longitudinal axis.

13. The optical fiber according to claim 1, wherein it is polarizing or polarization-maintaining.

14. A fiber laser comprising an optical fiber according to claim 1.

15. An optical amplifier fiber comprising an optical fiber according to claim 1.

\* \* \* \* \*